United States Patent
Kim et al.

(10) Patent No.: US 8,116,754 B2
(45) Date of Patent: Feb. 14, 2012

(54) METHOD OF PROVIDING SERVICE MENU AND SERVICE IN NETWORK ENVIRONMENT AND SERVICE PROVIDING APPARATUS THEREOF

(75) Inventors: Joon-hwan Kim, Seongnam-si (KR); Sang-hee Lee, Seoul (KR); Hyen-ji Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 11/709,187

(22) Filed: Feb. 22, 2007

(65) Prior Publication Data

US 2008/0009326 A1    Jan. 10, 2008

(30) Foreign Application Priority Data

Jul. 7, 2006   (KR) .......................... 10-2006-0063862

(51) Int. Cl.
*H04M 3/00*   (2006.01)
(52) U.S. Cl. ..................................... 455/420; 455/414.1
(58) Field of Classification Search ............... 455/414.1, 455/420
See application file for complete search history.

(56) References Cited

U.S. PATENT DOCUMENTS

| | | | |
|---|---|---|---|
| 2004/0203737 A1* | 10/2004 | Myhre et al. | 455/426.1 |
| 2005/0232583 A1 | 10/2005 | Kubota | |
| 2005/0235048 A1* | 10/2005 | Costa-Requena et al. | 709/219 |
| 2005/0235077 A1* | 10/2005 | Kubota | 710/62 |
| 2006/0089993 A1 | 4/2006 | Tsuruyama et al. | |
| 2006/0105718 A1* | 5/2006 | Ozluturk et al. | 455/67.11 |

FOREIGN PATENT DOCUMENTS

KR    10-2006-004912 A    1/2006

OTHER PUBLICATIONS

G. Schneider et al., Adhoc Personal Ubiquitous Multimedia Services Via UPNP, 2001, pp. 1108-1111, IEEE International Conference on Multimedia Expo, USA.

* cited by examiner

*Primary Examiner* — Steven Lim
(74) *Attorney, Agent, or Firm* — Sughrue Mion, PLLC

(57) ABSTRACT

A method of providing a service menu and a service in a network environment and a service providing apparatus thereof are provided. The method includes evaluating a context on a current situation of an electronic, and creating and displaying a user menu on which information on external service providing apparatuses associated with the evaluated context is enumerated. The list of the service functions required according to the condition of the user and the context is provided, and the service function desired by the user is automatically executed, thereby improving the user convenience.

29 Claims, 4 Drawing Sheets

METHOD OF PROVIDING SERVICE MENU AND SERVICE IN NETWORK ENVIRONMENT AND SERVICE PROVIDING APPARATUS THEREOF

CROSS-REFERENCE TO RELATED APPLICATIONS

This application claims priority from Korean Patent Application No. 2006-63862, filed Jul. 7, 2006, in the Korean Intellectual Property Office, the entire contents of which is incorporated herein by reference.

BACKGROUND OF THE INVENTION

1. Field of the Invention

Apparatuses and methods consistent with the present invention relate to providing a service menu and a service in a network environment, and more particularly to a method of providing a list of required service functions according to a condition of a user and a context and automatically executing a service function requested by the user, and a service providing apparatus using the above method.

2. Description of the Related Art

Recently, home electronics, such as digital TV, internet refrigerator, video, audio, and others, are now connected to each other via one network thereby to configure a home network. Further, a home network, in which a communication medium, a security medium, and others can be unified and managed by data communication via a network, as well as home electronics, has been put to practical use. That is, the home electronics are connected to other home electronics via a network interface thereby to configure one network as a whole.

The home electronics interworking with the home network, i.e., electronic devices, are changed into intelligent devices. Consequently, the electronics can provide diverse services, and can interwork with each other. As a result, a user's desire to receive more convenient service is also increased.

Under a wireless network environment composed of a plurality of electronic devices, there may be a case in which while a user uses any one electronic device, the user wishes to use another service through the electronic device. In this instance, the user must retrieve an electronic device that provides the interested service among electronic devices interworking with the electronic device, under a conventional network environment.

More specifically, electronic devices interworking with each other interchange information via a wireless network interface to identify electronic devices connected to each other through the network. In this instance, while the user uses any one electronic device and requests a list of electronic devices so as to use other services through the electronic device, the electronic device displays all of the electronic devices connected to each other through the network as a list.

If all of the electronic devices connected to each other through the network are enumerated without any aligning standard, the number of the electronics is increased. As a result, it is difficult for the user to find an electronic that provides a desired service. That is, the user must retrieve the list in full to find an electronic that provides the desired service, thereby causing the user's inconvenience to increase.

SUMMARY OF THE INVENTION

An aspect of the present invention is to provide a method of providing a service menu and a service in a network environment and a service providing apparatus thereof, which can provide a list of required service functions according to a condition of a user and a context and automatically execute a service function requested by the user.

The foregoing and other aspects are substantially realized by providing a method of providing a service menu and a service in a network environment, which comprises evaluating a context on a current situation of an electronic, and creating and displaying a user menu on which information on external service providing apparatuses associated with the evaluated context is enumerated.

The information on the external service providing apparatuses may comprise service functions provided by the external service providing apparatuses, and the method may further comprise evaluating a service function associated with the evaluated context on the basis of the information on the external service providing apparatuses associated with a previously stored context.

The user menu may comprise a list of service functions to be evaluated associated with the evaluated context.

The user menu may comprise a list of service functions of the external service providing apparatuses associated with the evaluated context.

The method may further comprise transmitting a service providing command to the external service providing apparatus that provides the service function selected in the user menu according to the evaluated context, thereby providing the selected service function.

If there is more than one external service providing apparatus that provides the selected service function, the method may further comprise receiving a command of selecting any one of the external service providing apparatuses.

If it is impossible to communicate with the external service providing apparatus that provides a service function according to the evaluated context, the creating and displaying the user menu may not display the service function on the user menu.

The network environment may comprise a wireless network.

In another aspect of the present invention, there is provided a method of providing a service menu and a service in a network environment, which comprises evaluating a selected classification condition, and creating and displaying a user menu on which external service providing apparatuses connected to each other via a network are classified and enumerated according to the evaluated classification condition.

The classification condition may comprise at least one of the service functions provided by the external service providing apparatuses and the types of the external service providing apparatuses.

The user menu may comprise a list classifying the external service providing apparatuses connected to each other via the network according to the classification condition.

The network environment may comprise a wireless network.

Another aspect of the present invention is to provide a service providing apparatus which comprises a memory for storing information on external service providing apparatuses associated with a context on a use situation of an electronic, and a controller for evaluating the context on a current use situation, and creating and displaying a user menu on which information on external service providing apparatuses associated with the evaluated context is enumerated on the basis of the information on the external service providing apparatuses associated with the context on the use situation stored in the memory.

Specifically, the information on the external service providing apparatuses comprises service functions provided by the external service providing apparatuses, and the controller evaluates a service function associated with the evaluated context on the basis of the information on the external service providing apparatuses associated with the context stored in the memory.

The controller may create the user menu as a list of service functions to be evaluated associated with the evaluated context.

The service providing apparatus may further comprise a wireless interface that provides a communication interface to the external service providing apparatuses, and the controller that transmits a service providing command to the external service providing apparatus that provides the service function selected in the user menu according to the evaluated context, thereby providing the selected service function.

If it is impossible to communicate with the external service providing apparatus that provides a service function according to the evaluated context, the controller may not display the service function on the user menu.

In another aspect of the present invention, there is provided a service providing apparatus which comprises an input unit that receives at least one selection command among classification conditions, and a controller that classifies and enumerates external service providing apparatuses connected to each other via a network according to the selected classification condition.

The classification condition may comprise at least one of the service functions provided by the external service providing apparatuses and the types of the external service providing apparatuses, and is a condition classifying the external service providing apparatuses connected to each other via the network.

The controller may create a list classifying the external service providing apparatuses connected to each other via the network according to the classification condition.

The service providing apparatus may further comprise a wireless interface providing a communication interface to the external service providing apparatuses connected to each other via the network.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE PRESENT INVENTION

Figure 1:
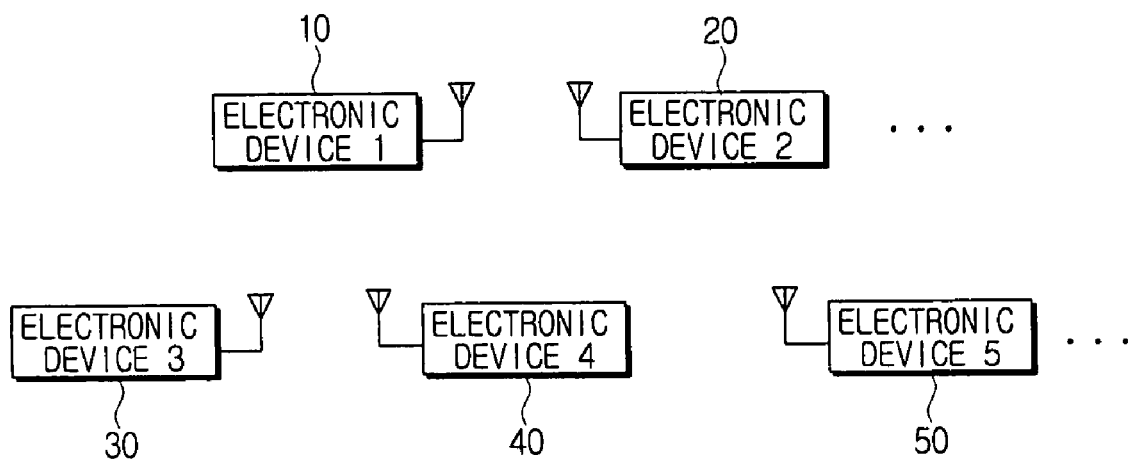
FIG. 1 is a view schematically illustrating a wireless network comprising a service providing apparatus according to an exemplary embodiment of the present invention.

Hereinafter, exemplary embodiments of the present invention will be described in detail with reference to the accompanying drawings.

In the following description, the same drawing reference numerals are used for the same elements even in different drawings. Matters defined in the description such as a detailed construction and elements are merely provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a view schematically illustrating a wireless network comprising a service providing apparatus according to an exemplary embodiment of the present invention.

Referring to FIG. 1, first to fifth electronic devices 10, 20, 30, 40, and 50 are wirelessly connected to configure a wireless network which can transmit data, and thus interwork with each other. The first to fifth electronic devices 10, 20, 30, 40, and 50 are service providing apparatuses of providing a user with a service, and communicate with each other via a wireless interface such as wireless 1394, home RF, Bluetooth, wireless LAN, or UWB.

Figure 2:
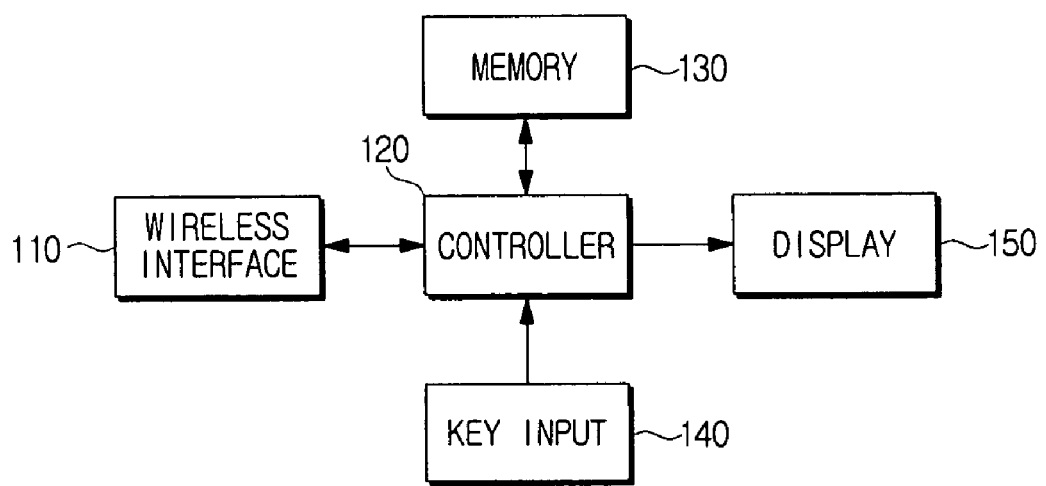
FIG. 2 is a block diagram illustrating a service providing apparatus according an exemplary embodiment of the present invention.

FIG. 2 is a block diagram illustrating the service providing apparatus according an exemplary embodiment of the present invention.

The service providing apparatus is the general term for the first to fifth electronic devices 10, 20, 30, 40, and 50, and is to provide a user menu according to a condition of the user and a context and to automatically provide a service function requested by the user.

Referring to FIG. 2, the service providing apparatus, that is, the first to fifth electronic devices 10, 20, 30, 40, and 50 comprise a wireless interface 110, a controller 120, a memory 130, a key input 140, and a display 150, respectively. The first electronic device 10 will now be described by way of example.

The wireless interface 110 provides wireless communication between the first electronic device 10 and second to fifth electronic devices 20, 30, 40, and 50.

The controller 120 transmits information of the first electronic device 10, such as ID, address, electronic name, electronic type, service function, etc., to the second to fifth electronic devices 20, 30, 40, and 50. The controller 120 also receives the information from the second to fifth electronic devices 20, 30, 40, and 50. As a result, the first to fifth electronic devices 10, 20, 30, 40, and 50 identify its information and recognize the electronics connected to each other through the network.

The controller 120 stores the information on the second to fifth electronic devices 20, 30, 40, and 50 transmitted through the wireless interface 110, that is, the information on the household apparatuses connected to each other through the network, in the memory 130.

The memory 130 is stored with the information on the electronic devices connected to each other through the network and the information on the electronic device according to the context, specifically, the service function information provided by the electronic devices according to the context.

The context is defined as the situation at the time when the service provided by the first electronic device 10 is used, and the service function information related to the context is the information associated with the service function to be determined as it is useful if it is provided under the situation at the point of the use. For example, a function of transmitting and printing a captured image can be useful in the situation where an image is captured. In contrast, a function of amplifying and outputting an audio can be useful in the situation where a movie is played.

The key input 140 includes keys for selecting a condition to classify the electronic devices to be connected to each other through the network, a service function to be used, an electronic to be used, and others.

If the user selects the classification condition by using the key input 140, the controller 120 provides a user menu according to the selected classification condition. Specifically, the controller 120 classifies and enumerates all electronic devices to which it can access under the selected condition, on the basis of the information on the electronic devices connected to each other through the network stored in the memory 130, and displays the list on the display 150.

If the user selects the service function to be used by using the key input 140, the controller 120 transmits a service providing command to an electronic device providing the selected service function, for example, the second electronic device 20, via the wireless interface 110 to provide the service.

In addition, if the user selects an electronic device to be used by using the key input 140, the controller 120 transmits a service providing command to the selected electronic device, for example, the second electronic device 20, via the wireless interface 110 to provide the service.

The controller 120 provides the user menu in view of the context of the first electronic device 10. More specifically, the controller 120 evaluates the service function or interworking electronic required by the first electronic device 10 required by the first electronic device 10, and creates the list of the evaluated service function or interworking electronic to display the same on the display 150. In this instance, the controller 120 evaluates the required service function on the basis of the service function information according to the context stored in the memory 130.

In the above exemplary embodiment, the first to fifth electronic devices 10, 20, 30, 40, 50, as the service providing apparatus, includes the wireless interface 110, the controller 120, the memory 130, the key input 140, and the display 150, respectively.

However, alternative embodiments are also possible. For example, the service providing apparatus may include the memory 130 for storing information on external service providing apparatuses associated with a context on a use situation of an electronic, and the controller 120 for evaluating the context on a current use situation, and creating and displaying a user menu on which information on external service providing apparatuses associated with the evaluated context is enumerated on the basis of the information on the external service providing apparatuses associated with the context on the use situation stored in the memory 130.

The service providing apparatus may further include an input unit for receiving at least one selection command among classification conditions, and a controller 120 for creating and displaying a user menu on which external service providing apparatuses connected to each other via a network are classified and enumerated according to the selected classification condition.

Figure 3:
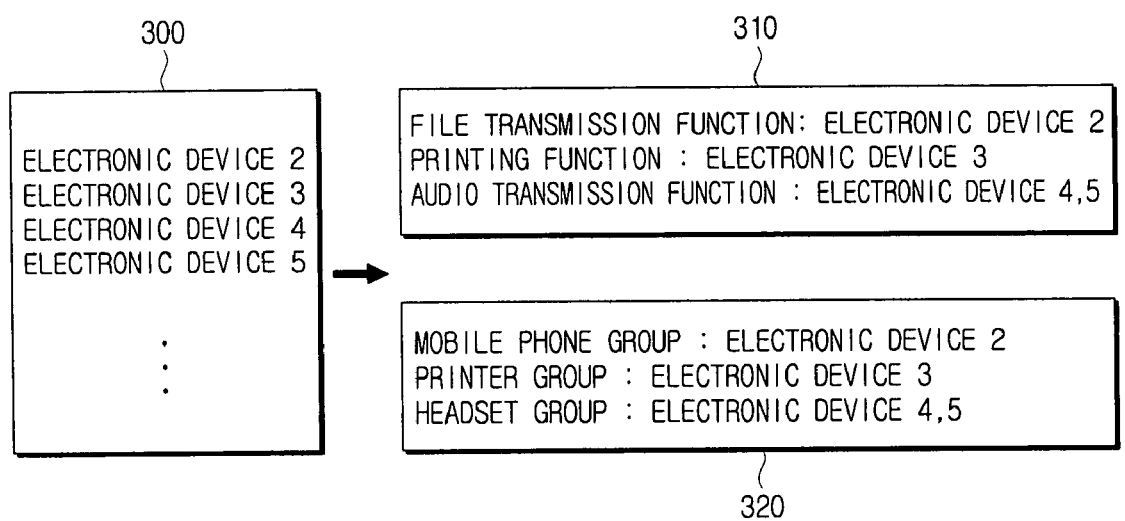
FIG. 3 is a view illustrating a service menu providing method of a service providing apparatus according to an exemplary embodiment of the present invention.

FIG. 3 is a view illustrating the service menu providing method of the service providing apparatus according to an exemplary embodiment of the present invention.

FIG. 3 shows lists containing the second to fifth electronic devices 20, 30, 40, and 50, i.e., a list 300 of the electronic devices connected to each other via the network, a list 310 classified by service functions, and a list 320 classified by electronic types. The service function and the electronic type are conditions to classify the electronic devices connected to each other through the network.

If the user selects the service function as the classification condition by using the key input 140, the controller 120 classifies the second to fifth electronic devices 20, 30, 40, and 50 by service functions on the basis of the information on the second to fifth electronic devices 20, 30, 40, and 50 stored in the memory 130. The controller 120 creates the service function list 310 classified by service functions to display the same on the display 150.

In the service function list 310, an electronic that provides a file transmission function is the second electronic device 20, an electronic that provides a printing function is the third electronic device 30, and an electronic that provides an audio transmission function is the fourth and fifth electronic devices 40 and 50.

If the user selects the electronic type as the classification condition by using the key input 140, the controller 120 classifies the second to fifth electronic devices 20, 30, 40, and 50 by electronic types on the basis of the information on the second to fifth electronic devices 20, 30, 40, and 50 stored in the memory 130. The controller 120 creates the electronic type list 320 classified by electronic types to display the same on the display 150.

In the electronic type list 320, an electronic corresponding to a mobile phone is the second electronic device 20, an electronic corresponding to a printer group is the third electronic device 30, and an electronic corresponding to a headset group is the fourth and fifth electronic devices 40 and 50.

Figure 4:
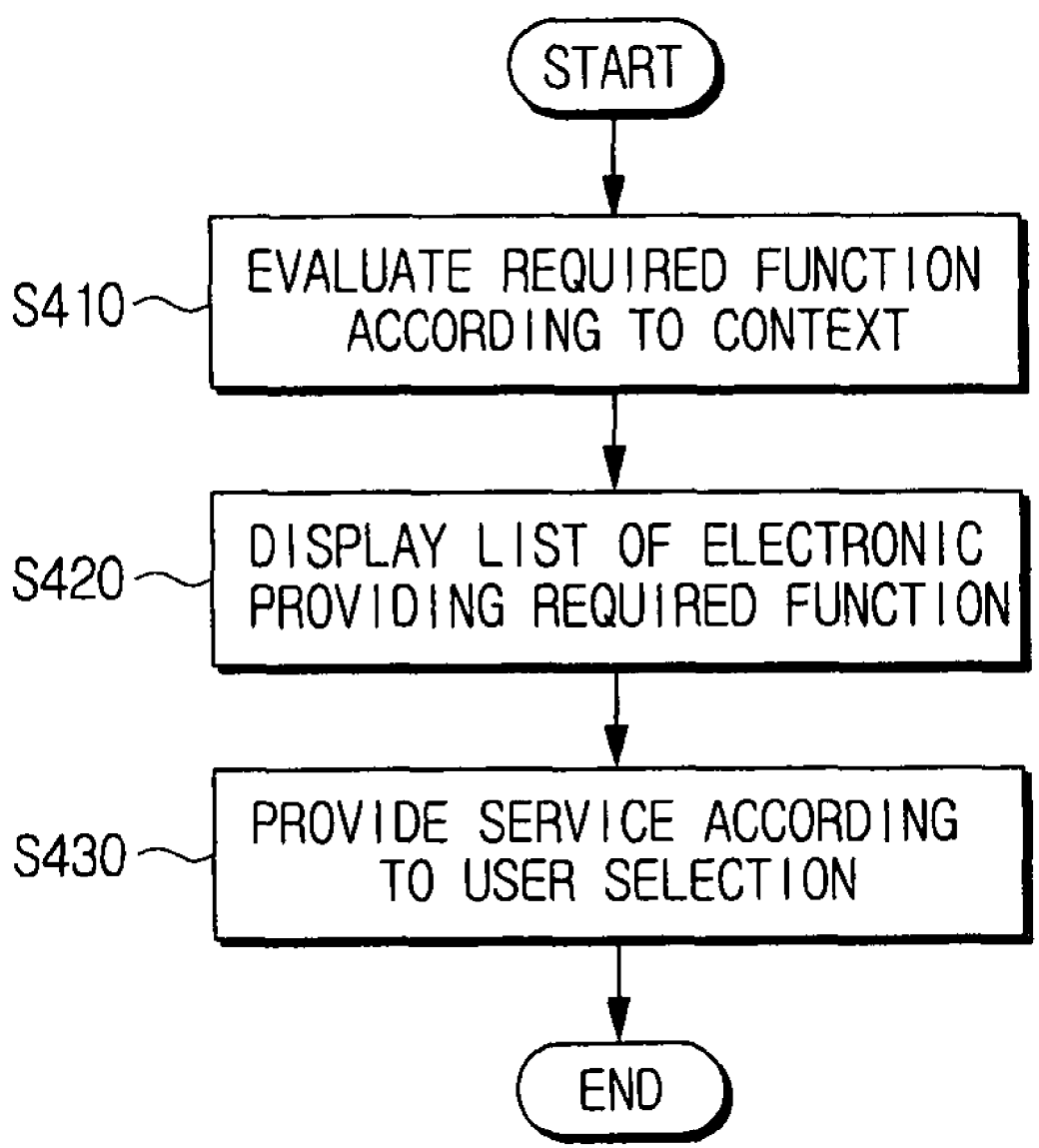
FIG. 4 is a flowchart illustrating a service menu providing method and a service providing method in connection with a service providing apparatus according to an exemplary embodiment of the present invention.

FIG. 4 is a flowchart illustrating the service menu providing method and the service providing method in connection with the service providing apparatus according to an exemplary embodiment of the present invention.

Referring to FIG. 4, the controller 120 evaluates a function to be required for the context in operation S410. Specifically, supposing that the first electronic device 10 is a digital TV and the user is capturing an image, the controller 120 evaluates a function required for the captured image, that is, a function to be determined whether it will be useful if it is provided. The controller 120 evaluates that there is required a function of transmitting or printing the captured image, on the basis of the service function information according to the context stored in the memory 130.

Otherwise, the controller 120 evaluates an interworking electronic to be required for the context. Specifically, the controller 120 evaluates an electronic required to process the captured image. The controller 120 evaluates that a mobile phone is required to transmit the capture image or a printer is required to print the captured image.

The controller 120 creates the list for the electronics that provide the required functions, and displays the same on the display 150 in operation S420. The controller 120 creates and displays the list containing the second electronic device 20 providing the file transmission function and the third electronic device 30 providing the printing function.

In this instance, in the case an electronic that provides the service function evaluated according to the context does not exist on the network or is turned off, unable to communicate with the controller 120, the controller 120 does not display the electronic that provides the interested service function on the list.

In addition, the controller 120 creates and displays a list containing the second electronic device 20 corresponding to the mobile phone group and the third electronic device 30 corresponding to the printer group.

The controller 120 provides the service selected by the user in operation S430. Specifically, if the user selects the printing function by using the key input 140, the controller 120 transmits the print command and the captured image to the third electronic device 30 that provides the printing function.

If the user selects the print group by using the key input 140, the controller 120 transmits the print command and the captured image to the third electronic device 30 contained in the printer group.

Figure 5:
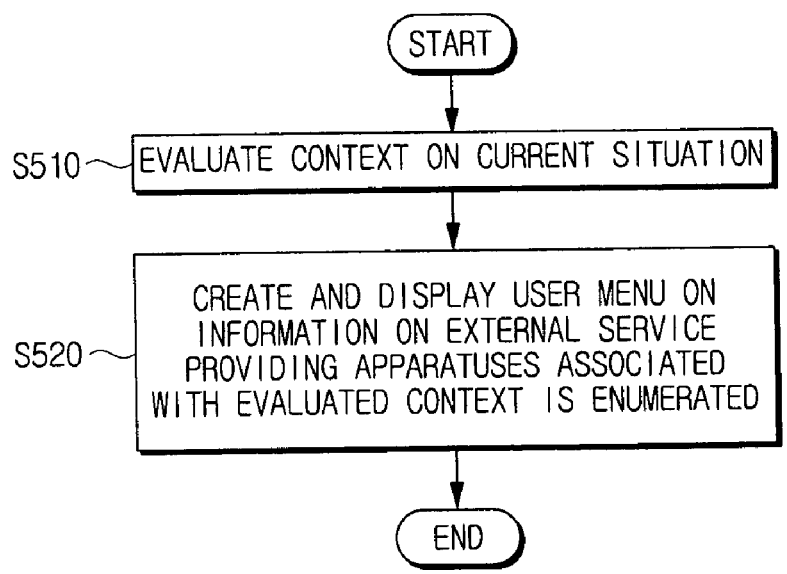
FIG. 5 is a flowchart illustrating a service menu providing method of a service providing apparatus according to another exemplary embodiment of the present invention.

FIG. 5 is a flowchart explaining a service menu providing method of a service providing apparatus according to another exemplary embodiment of the present invention.

Referring to FIG. 5, the controller 120 evaluates the context of a current situation of an electronic in operation S510.

The controller 120 creates and displays a user menu on which information on external service providing apparatuses associated with the evaluated context is enumerated in operation S520.

Figure 6:
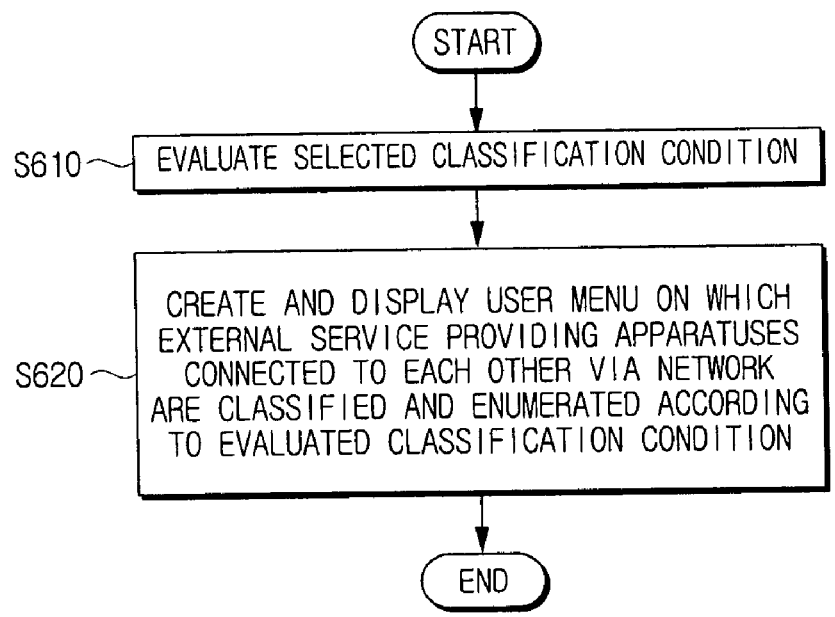
FIG. 6 is a flowchart illustrating a service menu providing method of a service providing apparatus according to yet another exemplary embodiment of the present invention.

FIG. 6 is a flowchart explaining a service menu providing method of a service providing apparatus according to yet another exemplary embodiment of the present invention.

Referring to FIG. 6, the controller 120 evaluates a selected classification condition through the input unit in operation S610.

Additionally, the controller 120 creates and displays a user menu on which external service providing apparatuses connected to each other via a network are classified and enumerated according to the evaluated classification condition in operation S620.

In the case there are two or more electronic device that provide the printing function or the electronic device contained in the print group, an operation of selecting any one of the electronics may be included. Alternatively, the controller 120 may optionally select any one of the electronics.

As described above, according to aspects of the present invention, the list of the service function required according to the condition of the user and the context is provided, and the service function desired by the user is automatically executed, thereby improving the user convenience.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of providing a service menu and a service in a network environment, the method comprising:
   evaluating, by a controller, a context on a current situation of an electronic device; and
   creating and displaying a user menu on which information on at least one external service providing apparatus, separate and distinct from the electronic device, associated with the evaluated context is enumerated,
   wherein the evaluating the context on the current situation of the electronic device includes determining automatically a current application service function being performed by the electronic device as the context on the current situation of the electronic device, and determining automatically which external service providing apparatuses of a plurality of external service providing apparatuses connected to the network environment provide a service function associated with the current application service function being performed by the electronic device, and
   the creating and the displaying the user menu comprises displaying only the external service providing apparatuses on the user menu which provide the associated service function.

2. The method of claim 1, wherein the information on the external service providing apparatuses comprises service functions provided by the external service providing apparatuses, and the method further comprises evaluating a service function associated with the evaluated context on the basis of the information on the external service providing apparatuses associated with a previously stored context.

3. The method of claim 2, wherein the user menu comprises a list of service functions to be evaluated associated with the evaluated context.

4. The method of claim 1, wherein the user menu comprises a list of service functions of the external service providing apparatuses associated with the evaluated context.

5. The method of claim 2, further comprising transmitting a service providing command to one of the external service providing apparatuses that provides a selected service function, wherein the selected service function is selected in the user menu according to the evaluated context.

6. The method of claim 5, further comprising receiving a command of selecting any one of the external service providing apparatuses if there is more than one external service providing apparatus that provides the selected service function.

7. The method of claim 2, wherein if it is impossible to communicate with one of the external service providing apparatuses that provides a service function according to the evaluated context, the creating and displaying the user menu does not display the service function on the user menu.

8. The method of claim 1, wherein the network environment comprises a wireless network.

9. The method of claim 1, wherein the associated service function provided by one of the external service providing apparatuses is a service function which aids the electronic device in performing the current application service function.

10. The method of claim 1, wherein the creating and the displaying of the user menu comprises displaying the information of the external service providing apparatuses which provide the service function associated with the current application service function being performed by the electronic device, and excluding from the displaying information of any external service providing apparatuses which do not provide the service function associated with the current application service function being performed by the electronic device.

11. A method of providing a service menu and a service in a network environment, the method comprising:
   evaluating a selected classification condition;
   evaluating, by a controller, a context on a current situation of an electronic device, the evaluating comprising:
   determining automatically a current application service function being performed by the electronic device as the context on the current situation of the electronic device, and
   determining automatically which external service providing apparatuses of a plurality of external service providing apparatuses connected to the network environment provide a service function associated with the current application service function being performed by the electronic device; and creating and displaying a user menu on which the external service providing apparatuses connected to each other via the network environment and which provide the associated service function associated are classified and enumerated according to the evaluated classification condition, wherein the external service providing apparatuses are placed in groups according to the selected classification condition, in which the external service providing apparatuses which share a common condition attribute are placed in a same group, while other external service providing apparatuses which do not share the common condition attribute are placed in at least one different group, and the creating and the displaying the user menu comprises displaying only the external service providing apparatuses on the user menu which provide the associated service function.

12. The method of claim 11, wherein the classification condition comprises at least one of service functions provided by the external service providing apparatuses and types of the external service providing apparatuses.

13. The method of claim 12, wherein the user menu comprises a list classifying the external service providing apparatuses connected to each other via the network according to the classification condition.

14. The method of claim 11, wherein the network environment comprises a wireless network.

15. The method of claim 11, wherein the creating and the displaying of the user menu comprises displaying the information of the external service providing apparatuses which provide the service function associated with the current application service function being performed by the electronic device, and excluding from the displaying information of any external service providing apparatuses which do not provide the service function associated with the current application service function being performed by the electronic device.

16. A service providing apparatus comprising:
a memory which stores information on external service providing apparatuses associated with a context on a use situation of an electronic device; and
a controller which evaluates the context on a current use situation of the electronic device, and creates and displays a user menu on which information on external service providing apparatuses, separate and distinct from the electronic device, associated with the evaluated context is enumerated on the basis of the information on the external service providing apparatuses associated with the context on the use situation stored in the memory,
wherein the controller evaluates the context on the current use situation of the electronic device by determining automatically a current application service function being performed by the electronic device as the context on the current use situation of the electronic device, and determining automatically which external service providing apparatuses of a plurality of external service providing apparatuses connected to the network environment provide a service function associated with the current application service function being performed by the electronic device, and
the controller creates and displays the user menu by displaying only the external service providing apparatuses on the user menu which provide the associated service function.

17. The service providing apparatus of claim 16, wherein the information on the external service providing apparatuses comprises service functions provided by the external service providing apparatuses, and the controller evaluates a service function associated with the evaluated context on the basis of the information on the external service providing apparatuses associated with the context stored in the memory.

18. The service providing apparatus of claim 17, wherein the controller creates a list of a service function to be evaluated as it is associated with the evaluated context, as the user menu.

19. The service providing apparatus of claim 17, further comprising a wireless interface which provides a communication interface to the external service providing apparatuses;
wherein the controller transmits a service providing command to one of the external service providing apparatuses that provides a selected service function, wherein the service function is selected in the user menu according to the evaluated context.

20. The service providing apparatus of claim 17, wherein if it is impossible to communicate with one of the external service providing apparatuses that provides a service function according to the evaluated context, the controller does not display the service function on the user menu.

21. The service providing apparatus of claim 16, wherein the associated service function provided by one of the external service providing apparatuses is a service function which aids the electronic device in performing the current application service function.

22. A service providing apparatus comprising:
an input unit which receives at least one selection command among classification conditions; and
a controller which classifies and enumerates external service providing apparatuses connected to each other via a network according to the selected classification condition,
wherein the controller evaluates a context on a current situation of an electronic device by determining automatically a current application service function being performed by the electronic device as the context on the current situation of the electronic device, and determining automatically which external service providing apparatuses of a plurality of external service providing apparatuses connected to the network environment provide a service function associated with the current application service function being performed by the electronic device, and
wherein the controller places the external service providing apparatuses which provide the associated service function associated in groups according to the at least one selected classification condition, in which the external service providing apparatuses which share a common condition attribute are placed in a same group, while other external service providing apparatuses which do not share the common condition attribute are placed in at least one different group, and
the controller creates and displays a user menu by displaying only the external service providing apparatuses on the user menu which provide the associated service function.

23. The service providing apparatus of claim 22, wherein the classification condition comprises at least one of service functions provided by the external service providing apparatuses and types of the external service providing apparatuses, and is a condition classifying the external service providing apparatuses connected to each other via the network.

24. The service providing apparatus of claim 22, wherein the controller creates a list classifying the external service providing apparatuses connected to each other via the network according to the classification condition.

25. The service providing apparatus of claim 22, further comprising a wireless interface providing a communication interface to the external service providing apparatuses connected to each other via the network.

26. A method of providing a service menu and a service in a network environment, the method comprising:
   evaluating, by a controller, a context on a current situation of an electronic device; and
   creating and displaying a user menu on which information on at least one external service providing apparatus, separate and distinct from the electronic device, associated with the evaluated context is enumerated,
   wherein the evaluating the context on the current situation of the electronic device includes determining automatically a current application service function being performed by the electronic device as the context on the current situation of the electronic device, and determining automatically which external service providing apparatuses of a plurality of external service providing apparatuses connected to the network environment provide a service function associated with the current application service function being performed by the electronic device, and
   wherein the creating and displaying the user menu comprises displaying external apparatuses providing service function associated with the current application service function distinctively from external apparatuses not providing service function associated with the current application service function.

27. A method of providing a service menu and a service in a network environment, the method comprising:
   evaluating a selected classification condition;
   evaluating, by a controller, a context on a current situation of an electronic device, the evaluating comprising:
   determining automatically a current application service function being performed by the electronic device as the context on the current situation of the electronic device, and
   determining automatically which external service providing apparatuses of a plurality of external service providing apparatuses connected to the network environment provide a service function associated with the current application service function being performed by the electronic device; and
   creating and displaying a user menu on which the external service providing apparatuses connected to each other via the network environment and which provide the associated service function associated are classified and enumerated according to the evaluated classification condition,
   wherein the external service providing apparatuses are placed in groups according to the selected classification condition, in which the external service providing apparatuses which share a common condition attribute are placed in a same group, while other external service providing apparatuses which do not share the common condition attribute are placed in at least one different group, and
   wherein the creating and displaying the user menu comprises displaying external apparatuses providing service function associated with the current application service function distinctively from external apparatuses not providing service function associated with the current application service function.

28. A service providing apparatus comprising:
   a memory which stores information on external service providing apparatuses associated with a context on a use situation of an electronic device; and
   a controller which evaluates the context on a current use situation of the electronic device, and creates and displays a user menu on which information on external service providing apparatuses, separate and distinct from the electronic device, associated with the evaluated context is enumerated on the basis of the information on the external service providing apparatuses associated with the context on the use situation stored in the memory,
   wherein the controller evaluates the context on the current use situation of the electronic device by determining automatically a current application service function being performed by the electronic device as the context on the current use situation of the electronic device, and determining automatically which external service providing apparatuses of a plurality of external service providing apparatuses connected to the network environment provide a service function associated with the current application service function being performed by the electronic device, and
   the controller creates and displays the user menu by displaying external apparatuses providing service function associated with the current application service function distinctively from external apparatuses not providing service function associated with the current application service function.

29. A service providing apparatus comprising:
   an input unit which receives at least one selection command among classification conditions; and
   a controller which classifies and enumerates external service providing apparatuses connected to each other via a network according to the selected classification condition,
   wherein the controller evaluates a context on a current situation of an electronic device by determining automatically a current application service function being performed by the electronic device as the context on the current situation of the electronic device, and determining automatically which external service providing apparatuses of a plurality of external service providing apparatuses connected to the network environment provide a service function associated with the current application service function being performed by the electronic device, and
   wherein the controller places the external service providing apparatuses which provide the associated service function associated in groups according to the at least one selected classification condition, in which the external service providing apparatuses which share a common condition attribute are placed in a same group, while other external service providing apparatuses which do not share the common condition attribute are placed in at least one different group, and
   the controller creates and displays a user menu by displaying external apparatuses providing service function associated with the current application service function distinctively from external apparatuses not providing service function associated with the current application service function.

* * * * *